United States Patent [19]
Oertley

[11] Patent Number: 4,881,930
[45] Date of Patent: Nov. 21, 1989

[54] SPROCKET ASSEMBLY

[75] Inventor: Thomas E. Oertley, Dunlap, Ill.

[73] Assignee: Caterpillar Inc., Peoria, Ill.

[21] Appl. No.: 314,679

[22] Filed: Feb. 23, 1989

[51] Int. Cl.⁴ ............................................. F16H 55/12
[52] U.S. Cl. ..................................... 474/162; 474/901
[58] Field of Search ........................ 474/161–163, 474/152–153, 901; 305/39, 41, 51, 56, 59

[56] References Cited

U.S. PATENT DOCUMENTS

| | | | |
|---|---|---|---|
| 1,390,198 | 9/1921 | Fossati | 474/162 |
| 2,365,544 | 12/1944 | Geyer et al. | 74/243 |
| 2,862,399 | 12/1958 | Ward et al. | 74/448 |
| 3,960,412 | 6/1976 | Shuler | 474/162 X |
| 3,996,814 | 12/1976 | Westlake | 74/243 |
| 4,058,352 | 11/1977 | Sogge | 474/901 X |
| 4,080,008 | 3/1978 | Groff et al. | 305/57 |
| 4,332,573 | 6/1982 | Uchida et al. | 474/94 |
| 4,511,186 | 4/1985 | Sasamoto | 305/57 |
| 4,522,611 | 6/1985 | Hiatt | 474/162 |
| 4,585,431 | 4/1986 | Umeda et al. | 474/94 |
| 4,752,281 | 6/1988 | Lammers | 474/162 |

FOREIGN PATENT DOCUMENTS 0006250 8/1981 European Pat. Off. .
2914127 8/1980 Fed. Rep. of Germany .
2082525A 3/1982 United Kingdom .

Primary Examiner—Thuy M. Bui
Attorney, Agent, or Firm—Claude F. White

[57] ABSTRACT

A drive sprocket assembly for driving an endless chain assembly for propelling a vehicle includes a housing, which is mountable to the power drive system of the vehicle, and a plurality of replaceable teeth structures which are secured to the housing. The housing includes a hub portion having a cushion band and spaced apart parallel flanges. Each tooth structure is in contact with the hub and is secured to the flanges by a plurality of retaining pins. Each tooth structure is resiliently isolated from the hub by the cushion band and from adjoining teeth structures by non-metallic pads. Conventional drive sprocket assemblies utilize a one-piece toothed sprocket, or sprocket segments having several teeth, bolted to a support member. These prior sprocket assemblies produce considerable noise from impacting of the sprocket teeth with an endless chain assembly. The subject sprocket assembly produces low levels of noise by utilizing individually replaceable teeth structures which are resiliently isolated from the support housing and from adjoining teeth structures.

16 Claims, 2 Drawing Sheets

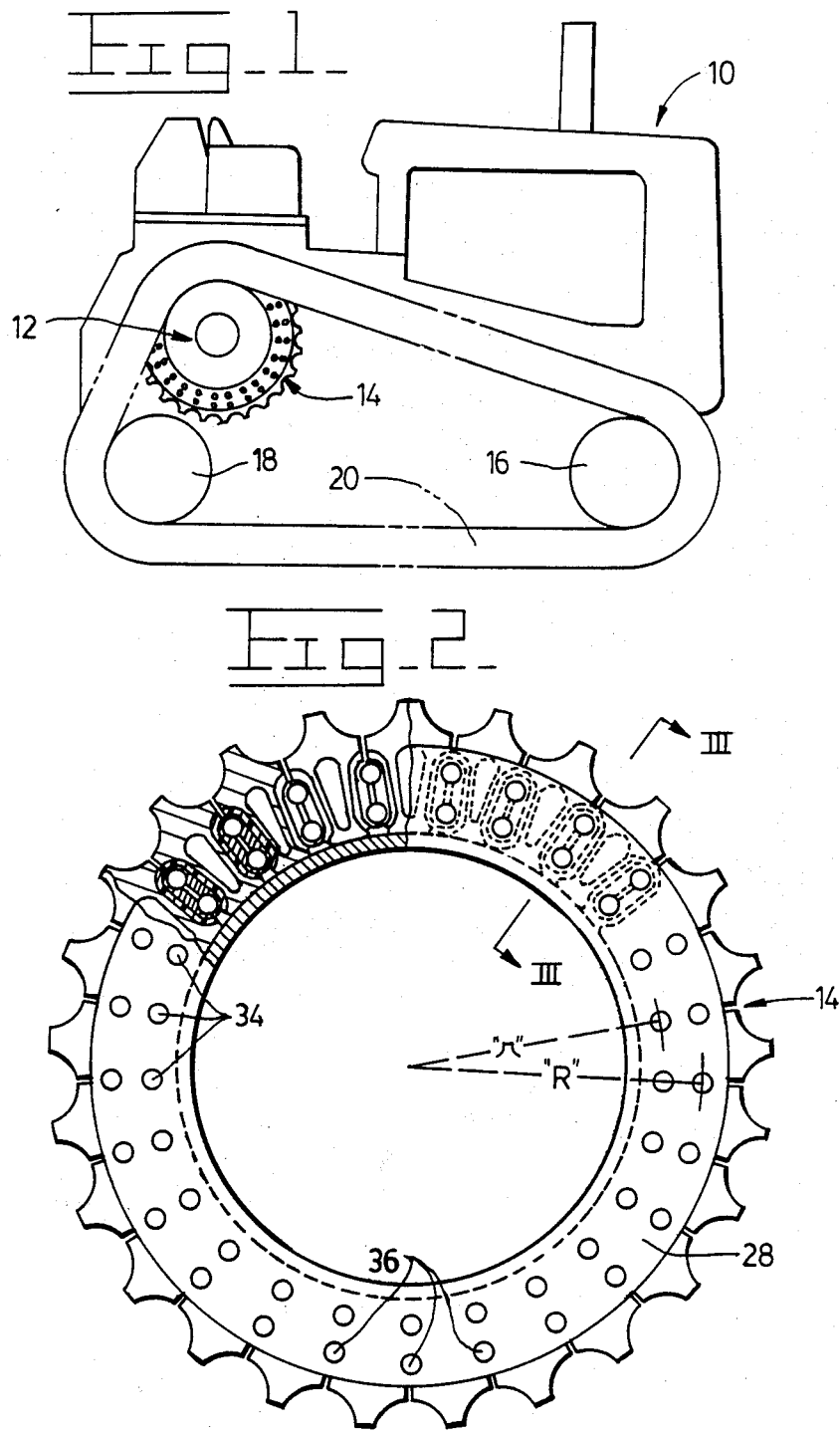

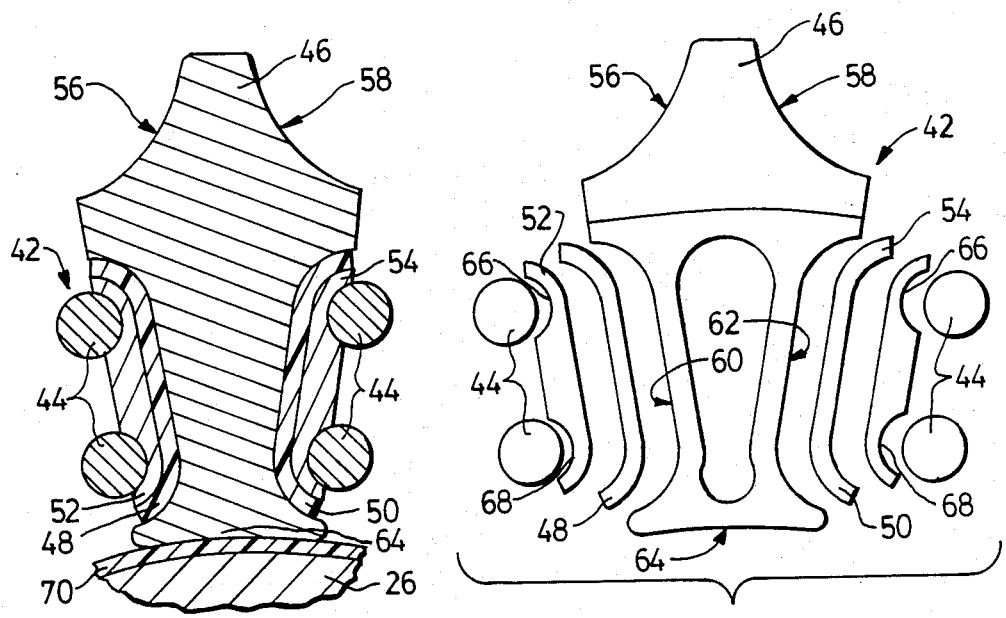
Fig_4_  Fig_5_
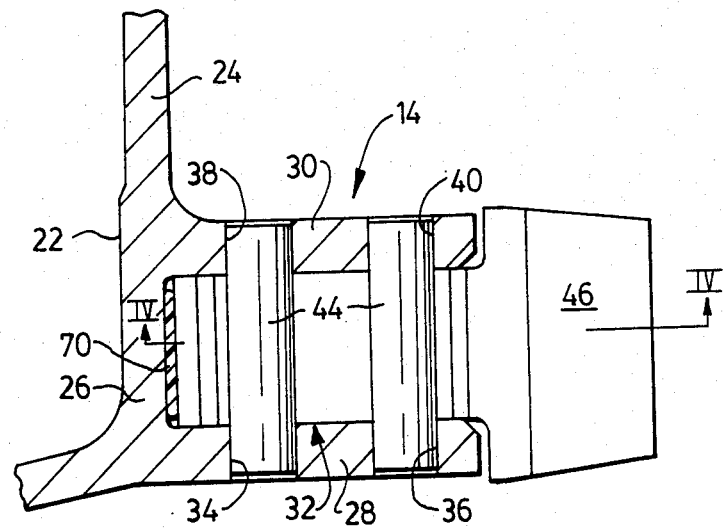
Fig_3_

SPROCKET ASSEMBLY

TECHNICAL FIELD

This invention relates generally to a drive sprocket assembly for a track-type vehicle and more particularly to a resilient drive sprocket assembly having a plurality of individually replaceable teeth structures with each tooth structure being resiliently isolated from adjacent tooth structures and from the drive sprocket support hub.

BACKGROUND ART

Earthmoving and construction type vehicles, which have endless self-laying track chain assemblies for support and propulsion, generally utilize a sprocket wheel to engage and drive the track chain. Several different types of sprocket wheels have been used in the past, including a single wheel member having a plurality of integral teeth, a circular support member for supporting wheel segments, each segment having several teeth, and hub members accommodating a plurality of separate individual teeth.

One type of drive sprocket having a plurality of separate, individual teeth bolted to a hub portion is disclosed in U.S. Pat. No. 2,365,544, issued to H. D. Geyer et al on Dec. 19, 1944. In this patent, the teeth are fulcrumed to the hub portion somewhere near the middle of the teeth so the teeth can rotate in either direction about the fulcrum. Resilient means are provided to return the teeth to their original no load position. This arrangement is intended to make the teeth self-adjusting to accommodate variations in the track chain.

Another type of sprocket having separate, individual teeth secured to a hub is shown in U.S. Pat. No. 3,996,814 issued to G. E. Westlake on Dec. 14, 1976. This patent discloses a plurality of link members secured together around the circumference of a hub. The links are keyed longitudinally and laterally on the hub. Each link carries one or more separate teeth projecting radially outwardly.

Still, another type of sprocket assembly with replaceable teeth is shown in U.S. Pat. No. 4,522,611, issued to D. M. Hiatt on July 11, 1985. This patent discloses a generally cylindrical sprocket hub equipped with a plurality of L-shaped pockets in the periphery of the hub. A replaceable tooth, having a partial T-shaped inner end, is intended to be received within each of the L-shaped pockets and locked in place by wedge lock means which operate against the T-shape of the tooth.

Each of the above-noted sprocket assemblies provide individual replaceable drive teeth. However, such sprocket assemblies appear to be quite complicated and costly and utilize intricately formed pieces. All of the above-noted patents would seem ineffective or quite limited in their ability to reduce noise levels during driving operation against an endless track chain assembly.

The present invention is directed to overcoming one or more of the problems as set forth above.

DISCLOSURE OF THE INVENTION

In one aspect of the present invention, a resilient drive sprocket assembly for a track-type vehicle transfer power from the vehicle to the endless track and includes a housing having a circular hub portion and first and second radially extending circular flanges. The first and second flanges define a space therebetween and each flange has a plurality of equally spaced first holes and a plurality of equally spaced second holes. The first holes are arranged in a circle having a first radius and the second holes are arranged in a circle having a second, greater radius. The sprocket assembly further includes a plurality of replaceable drive members, a plurality of resilient pads, and a plurality of retaining pins. The drive members and the resilient pads are adapted to fit in the space between the first and second flanges, and the retaining pins are adapted to penetrate the holes in the flanges.

In another aspect of the present invention, a tooth structure for a drive sprocket includes a tooth having first and second drive portions and first and second concave side portions, first and second resilient pads bonded to the tooth side portions, and first and second retaining members bonded to the respective resilient pads.

In self laying track-type vehicles utilizing endless track assemblies, the driving power from the vehicle is transferred to the endless track assembly by toothed sprocket members. As the sprocket members contact the endless track, noise is generated, and this noise can reach objectionable levels. Additionally, the noise is often transferred into the track assemblies and other machine components, where it is amplified. The subject invention provides a reduced noise level sprocket assembly for driving the endless track by utilizing a plurality of individual drive teeth of low mass which are resiliently isolated from other components of the drive sprocket assembly. Additionally, the undercarriage components and power train of the vehicle will experience lower stress since the resiliency of the subject sprocket assembly will limit shock loads.

BRIEF DESCRIPTION OF THE DRAWINGS

FIG. 1 is a diagrammatic side elevational view of a vehicle incorporating the sprocket assembly of the present invention;

FIG. 2 is an enlarged diagrammatic side elevational view, partly in section, of the sprocket assembly of the present invention;

FIG. 3 is a diagrammatic sectional view taken generally along lines III—III of FIG. 2;

FIG. 4 is a diagrammatic sectional view taken generally along lines IV—IV of FIG. 3; and FIG. 5 is a diagrammatic exploded view of the tooth structure of the sprocket assembly of the present invention.

BEST MODE FOR CARRYING OUT THE INVENTION

Referring to the drawings, a vehicle 10, such as a track-type tractor 10, has a powered drive system 12, a resilient drive sprocket assembly 14, first and second idler wheels 16,18, and an endless track chain assembly 20 which encircles the sprocket assembly 14 and the idler wheels 16,18. The sprocket assembly 14 is adapted to transfer power from the vehicle 10 to the track assembly 20. It is to be understood that many of the vehicle components, including the sprocket assembly 14, the idler wheels 16,18, and the track chain assembly 20 are duplicated on the side of the vehicle 10 which is not illustrated. Since these duplicate components operate in the same manner as those shown, the description and operation of the components illustrated applies to both sides of the vehicle.

The sprocket assembly 14 includes a housing 22 having a mounting portion 24, a circular hub portion 26, and first and second radially extending spaced apart circular flanges 28,30. The first flange 28 is spaced from and is substantially parallel to the second flange 30. The two flanges 28,30 define a space 32 therebetween. The first flange 28 has first and second pluralities, or arrays, of equally spaced through holes 34,36, and the second flange 30 has third and fourth pluralities, or arrays, of equally spaced through holes 38,40. The first and third arrays of holes 34,38 are arranged in a circle having a first radius "r", and the second and fourth arrays of holes 36,40 are arranged in a circle having a second radius "R", with the second radius "R" being grater than the first radius "r". Each hole 34 is the first array is in substantially axial alignment with one of the holes 38 in the third array, and each hole 36 in the second array is in substantially axial alignment with one of the holes 40 in the fourth array.

A plurality of individually replaceable resilient drive teeth structures 42 are positioned within the space 32 between the first and second flanges 28,30. The teeth structures 42 are equally spaced around the hub portion 26 and are retained within the space 32 by a plurality of retaining pins 44. Each one of the pins 44 is adapted to penetrate one of the holes 34,36 in the first flange 28 and a corresponding aligned hole 38,40 in the second flange 30.

Each tooth structure 42 includes a metallic drive member, or tooth 46, first and second non-metallic resilient pads 48,50, and first and second metallic retaining members 52,54. Each of the drive members 46 has first and second driving portions 56,58, first and second concave side retaining portions 60,62, and a base portion 64. Each of the retaining members 52,54 has first and second accurately shaped concave pockets 66,68. The pockets 66,68 are substantially similar in size and shape and are adapted to mate with the circumferential surfaces of the retaining pins 44. One of the first and second resilient pads 48,50 is adapted to fit against the respective first and second retaining portions 60,62 of each drive tooth 46, and one of the first and second retaining members 52,54 is adapted to fit against the respective first and second resilient pads 48, 50. Preferably, the resilient pads 48,50 are bonded to the tooth retaining portions 60,62 and the retaining members 52,54 are bonded to the resilient pads 48,50. It is also preferable that the resilient pads 48,50 be formed of an elastomeric material.

With particular reference to FIGS. 3 and 4, a resilient cushion band 70 of elastomeric material encircles the hub portion 26 and is positioned between the hub portion 26 and the drive members 46. Preferably, the drive members 46 and the retaining members 52,54 are formed of a powered metal material. In order for the pins 44 to securely hold the teeth structures 42 in place, the diameter of the holes 34,36,38,40 in the flanges 28,30 is slightly smaller than the diameter of the pins 44.

With particular reference to FIGS. 2 and 3, the centers of one hole of the first and third arrays 34,38 lie in a common plane with the centers of one hole of the second and fourth arrays 36,40. The centers of the other holes of the first, second, third, and fourth arrays 34,36,38,40 lie on similar but different planes. The first and third arrays of holes 34,38 are arranged in a first circle on the first and second flanges 28,30, and the second and fourth arrays of holes 36,40 are arranged on a second circle on the first and second flanges 28,30.

The first circle has a predetermined radius "r" and the second circle has a greater predetermined radius "R".

Industrial Applicability

The subject sprocket assembly 14 is particularly useful with earthmoving equipment and more specifically, self-laying track-type vehicles, such as vehicle 10. Power from the engine of the vehicle 10 is transmitted to the drive system 12, which then rotates the sprocket assembly 14. As the sprocket assembly 14 rotates, the teeth 46 contact portions of the track chain assembly 20, rotate it, and thereby propel the vehicle 10.

As the metal teeth 46 contact the metal track chain assembly 20, considerable noise is generated. Because the teeth 46 are isolated from the metal hub portion 26 of the housing 22, the noise is not transferred into the housing 22 and the drive system 12 where it could be amplified. Also, because of the resilient mounting and isolation of the teeth structures 42, each tooth 46 is a relatively small member which produces very little noise as it contacts the track chain assembly 20. Any amplification of such noise by the track chain assembly 20 is therefore of small magnitude.

Isolation and resilient mounting of the teeth 46 are provided by the various components of the teeth structures 42. To begin the buildup of the sprocket assembly 14, the resilient cushion band 70 is initially secured to the hub portion 26 of the housing 22. The plurality of teeth structures 42 are then inserted between the first and second flanges 28,30 until the base portion 64 of each tooth 46 contacts the cushion band 70. Each of the teeth structures 42 have been previously pre-assembled. This includes bonding of the first and second non-metallic pads 48,50 to the first and second side retaining portions 60,62 respectively, and the subsequent bonding of the first and second retaining members 52,54 to the first and second non-metallic pads 48,50 respectively.

Once the pre-assembled teeth structures 42 are in place between the first and second flanges 28,30, the first circle of retaining pins 44 are driven through the first and third arrays of aligned holes 34 and 38 in the first and second flanges 28,30. This first group of retaining pins 44, arranged on the first circle having the radius "r", produces little or no compression of the first and second non-metallic pads 48,50 and the resilient band 70. The second circle of retaining pins 44 are then driven through the second and fourth arrays of aligned holes 36 and 40 in the first and second flanges 28,30. As the retaining pins 44 are driven into place, they contact the concave pockets 66,68 of the retaining members 52,54. As the pins 44, arranged on the second circle having the larger radius "R", are driven into place, they produce a relatively large compression of the non-metallic pads 48,50 and the resilient band 70. In order to produce the maximum preload on the non-metallic pads 48,50, some permanent deformation of these pads 48,50 may occur. When all of the pins 44 have been driven into place, the sprocket assembly is complete and each tooth structure 42 is resiliently isolated from the hub 26 and from adjoining teeth structures 42.

Replacement of individually worn or damaged teeth 46 is easily provided by the subject sprocket assembly 14. Once the worn tooth 46 has been identified, the two pins 44 on each side of the tooth 46 are removed and the tooth 46 is then easily extracted from between the flanges 28,30. A new tooth structure 46 is then inserted and the four retaining pins 44 are driven back into place to secure the new tooth structure 46 and once again make a complete sprocket assembly 14.

Other aspects, objects, and advantages of this invention can be obtained from a study of the drawings, the disclosure, and the appended claims.

I claim:

1. A resilient drive sprocket assembly, comprising:

a housing having a mounting portion, a circular hub portion, and first and second circular flanges, said first flange being spaced from and substantially parallel to said second flange, said first and second flanges defining a space therebetween, said first flange having first and second arrays of equally spaced through holes, said second flange having third and fourth arrays of equally spaced through holes, each one of said first array of holes being in substantially axial alignment with one of said third array of holes, and each one of said second array of holes being in substantial axial alignment with one of said fourth array of holes;

a plurality of individually replaceable drive members, each member having first and second retaining portions and first and second driving portions, said drive members being positioned within said space between said first and second flanges and equally spaced around said hub portion;

a plurality of resilient pads, a respective pad being adapted to fit against the first and second retaining portion of each drive member;

a plurality of retaining members, one retaining member being adapted to fit against each resilient pad; and a plurality of retaining pins, each pin being adapted to penetrate one of said holes in said first flange and a corresponding aligned hole in said second flange.

2. The drive sprocket assembly, as set forth in claim 1, including a resilient cushion band encircling said hub portion and positioned between said hub and said drive members.

3. The drive sprocket assembly, as set forth in claim 2, wherein said cushion band is formed of an elastomeric material.

4. The drive sprocket assembly, as set forth in claim 1, wherein said resilient pads are formed of an elastomeric material.

5. The drive sprocket assembly, as set forth in claim 1, wherein said drive members are formed of a powdered metal material.

6. The drive sprocket assembly, as set forth in claim 1, wherein said retaining members are formed of a powered metal material.

7. The drive sprocket assembly, as set forth in claim 1, wherein the diameter of said holes in said first and second flanges is smaller than the diameter of said pins.

8. The drive sprocket assembly, as set forth in claim 1, wherein each of said retaining members has first and second arcuately shaped pockets, each of said pockets being adapted to mate with the circumferential surface of one of said retaining pins.

9. The drive sprocket assembly, as set forth in claim 1, wherein the center of one hole of said first and third arrays of holes lies in a common plane with the center of one hole of said second and fourth arrays of holes, the centers of said other holes of said first, second, third, and fourth arrays lying on different planes.

10. The drive sprocket assembly, as set forth in claim 1, wherein said resilient pads are bonded to said drive member.

11. The drive sprocket assembly, as set forth in claim 1, wherein said retaining members are bonded to said resilient pads.

12. The drive sprocket assembly, as set forth in claim 1, wherein said first and third arrays of holes are arranged on a first circle on said first and second flanges respectively, said circle having a predetermined first radius "r".

13. The drive sprocket assembly, as set forth in claim 12, wherein said second and fourth arrays of holes are arranged on a second circle on said first and second flanges respectively, said circle having a predetermined second radius "R", said second radius "R" being greater than said first radius "r".

14. A drive sprocket assembly for a track-type vehicle, said vehicle having an endless track, said sprocket assembly being adapted to transfer power from the vehicle to the track, comprising:

a housing having a circular hub portion and first and second radially extending spaced apart flanges, said flanges defining a space therebetween, said first flange having a plurality of equally spaced first holes arranged in a first circle and a plurality of equally spaced second holes arranged in a second circle, said second circle having a greater radius than said first circle, said second flange having a plurality of equally spaced third holes arranged in a third circle and a plurality of equally spaced fourth holes arranged in a fourth circle, said fourth circle having a greater radius than said third circle, said first and third circles having substantially the same radius and said second and fourth circles having substantially the same radius;

a plurality of individually replaceable resilient drive teeth structures positioned within said space between said first and second flanges and equally spaced around said hub portion; and a plurality of retaining pins, one pin positioned in each hole of said first and second flanges.

15. The drive sprocket assembly, as set forth in claim 14, wherein each of said drive teeth structures includes a metallic tooth, first and second non-metallic resilient pads bonded to opposite sides of said tooth, and first and second metallic retaining members bonded respectively to said first and second pads.

16. A tooth structure for a drive sprocket, comprising:

a metallic tooth having first and second drive portions, first and second concave side retaining portions, and a base portion;

first and second non-metallic resilient pads bonded respectively to said first and second concave side retaining portions of said tooth; and first and second metallic retaining members bonded respectively to said first and second resilient pads, said first and second retaining members each having first and second arcuately shape concave pockets.

* * * * *